United States Patent
Wang et al.

(10) Patent No.: US 11,513,697 B2
(45) Date of Patent: Nov. 29, 2022

(54) STORAGE APPARATUS AND CONTROL SYSTEM FOR THE SAME

(71) Applicant: MITAC COMPUTING TECHNOLOGY CORPORATION, Taoyuan (TW)

(72) Inventors: Jyun-Jie Wang, Taoyuan (TW); Cheng-Tung Wang, Taoyuan (TW); Yen-Lun Tseng, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 17/467,052

(22) Filed: Sep. 3, 2021

(65) Prior Publication Data
US 2022/0075533 A1    Mar. 10, 2022

(30) Foreign Application Priority Data
Sep. 9, 2020   (TW) .................................. 109130874

(51) Int. Cl.
*G06F 3/06* (2006.01)

(52) U.S. Cl.
CPC .......... *G06F 3/0619* (2013.01); *G06F 3/0613* (2013.01); *G06F 3/0622* (2013.01);
(Continued)

(58) Field of Classification Search
CPC .... G06F 3/0619; G06F 3/0613; G06F 3/0622; G06F 3/0632; G06F 3/0659;
(Continued)

(56) References Cited

U.S. PATENT DOCUMENTS

| | | | |
|---|---|---|---|
| 2002/0133735 A1* | 9/2002 | McKean | G06F 11/2092 714/5.11 |
| 2003/0110330 A1 | 6/2003 | Fujie et al. | |

(Continued)

FOREIGN PATENT DOCUMENTS

| | | |
|---|---|---|
| CN | 102455950 A | 5/2012 |
| TW | I675296 B | 10/2019 |

OTHER PUBLICATIONS

Search Report appended to an Office Action, which was issued to Taiwanese counterpart application No. 109130874 by the TIPO dated Jun. 29, 2022 with an English translation thereof.
(Continued)

*Primary Examiner* — Zhuo H Li
(74) *Attorney, Agent, or Firm* — Lewis Roca Rothgerber Christie LLP

(57) ABSTRACT

A control system for a storage apparatus includes two input/output modules (IOMs), and two non-volatile memory (NVM) devices that are electrically connected to the IOMs, respectively, and that each store a firmware code. Each of the IOMs is configured to execute a firmware corresponding to the firmware code stored in the corresponding NVM device, and to enter an active mode or a passive mode after executing the firmware. The IOMs are configured such that when one IOM operating in the passive mode detects abnormal operation of the other IOM operating in the active mode, the one IOM sends, to the other IOM, the firmware code stored in the NVM device electrically connected to the one IOM, in order to update the firmware code in the NVM device electrically connected to the other IOM.

20 Claims, 1 Drawing Sheet

(52) U.S. Cl.
CPC .......... *G06F 3/0632* (2013.01); *G06F 3/0659* (2013.01); *G06F 3/0673* (2013.01)

(58) Field of Classification Search
CPC ............... G06F 3/0673; G06F 11/0727; G06F 11/0763; G06F 11/0793; G06F 11/2092
See application file for complete search history.

(56) References Cited

U.S. PATENT DOCUMENTS

| | | | |
|---|---|---|---|
| 2010/0199272 A1 | 8/2010 | Mahajan et al. | |
| 2015/0286595 A1* | 10/2015 | Mcmenamin ....... | G06F 11/2092 710/264 |
| 2017/0123927 A1* | 5/2017 | Su ........................ | G06F 9/4403 |

OTHER PUBLICATIONS

Search Report appended to an Office Action, which was issued to Taiwanese counterpart application No. 109130874 by the TIPO dated Nov. 25, 2021, with an English translation thereof.

\* cited by examiner

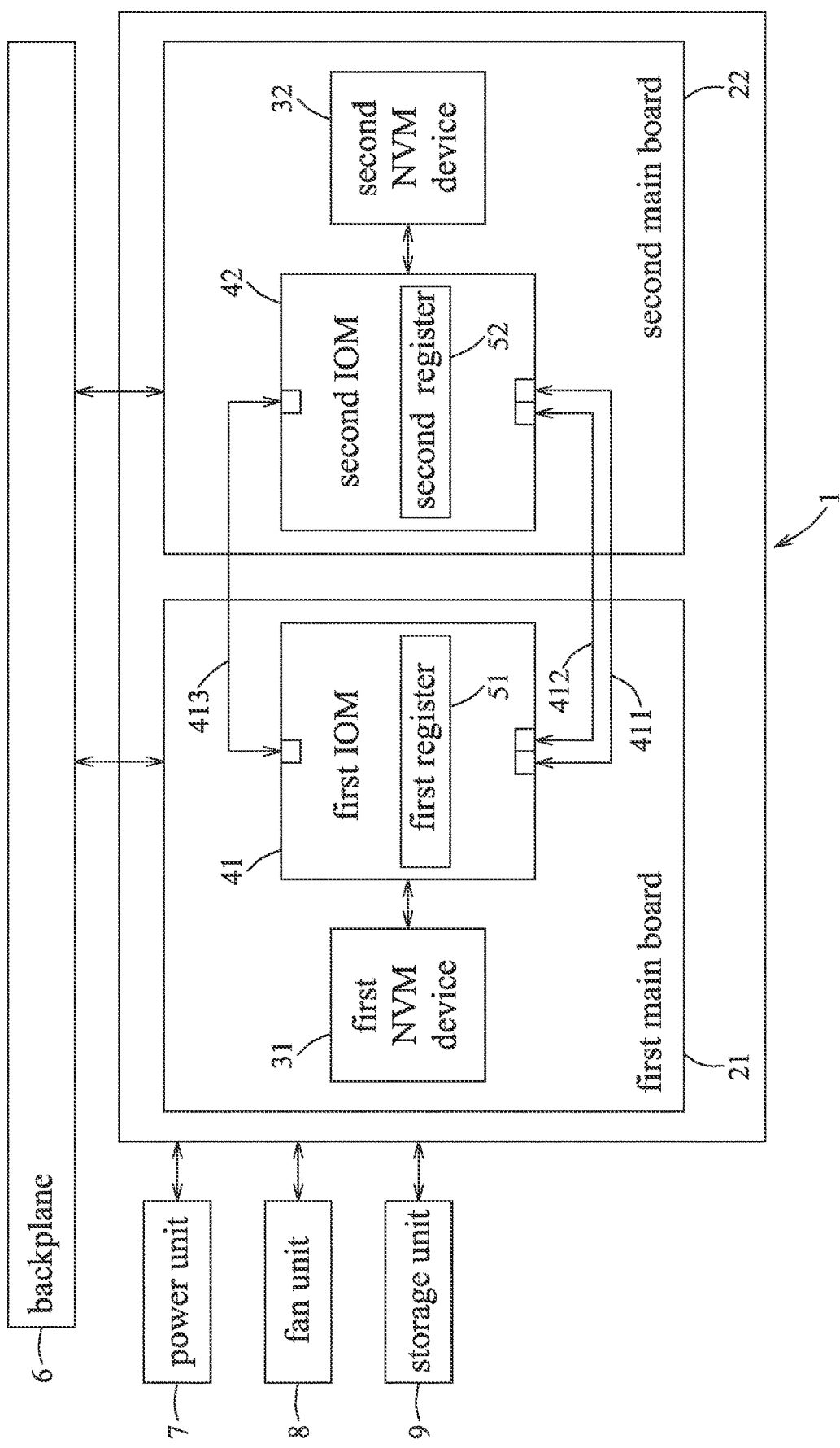

STORAGE APPARATUS AND CONTROL SYSTEM FOR THE SAME

CROSS-REFERENCE TO RELATED APPLICATION

This application claims priority of Taiwanese Invention Patent Application No. 109130874, filed on Sep. 9, 2020.

FIELD

The disclosure relates to a storage apparatus, and more particularly to a control system for the storage apparatus.

BACKGROUND

A conventional enterprise storage system is a high availability (HA) system that includes a power unit, a fan unit, two main boards, at least one hard disk drive (HDD), and two input/output modules (IOMs) for monitoring and managing the at least one HDD, the power unit and the fan unit. The two IOMs are disposed on the two main boards, respectively. One of the two IOMs is adapted to operate in an active mode, and the other is adapted to operate in a passive mode so as to serve as a backup. After being powered on, each of the two IOMs performs an initialization procedure to execute a firmware by reading a firmware code (which may be an image file) from a non-volatile memory device. Errors that might occur in the IOM operating in the active mode are often caused by an error of the firmware.

In order to address the problem in IOM operation caused by a defective firmware, a conventional solution is to dispose, on each of the two main boards, two non-volatile memory devices that include a default memory device and a backup memory device and that both store a firmware code. The firmware codes respectively stored in the two non-volatile memory devices may be the same, or of different versions (e.g., one is of an original or default version corresponding to factory settings, and the other is of a newer version). The IOM disposed on the main board is preset to read the firmware code stored in the default memory device that is disposed on the same main board after being powered on, in order to execute the firmware corresponding to the firmware code. When the IOM that is operating in the active mode and that is executing the firmware that comes from the default memory device encounters an error caused by the firmware, the IOM may read the firmware code stored in the backup memory device to execute the firmware corresponding to the firmware code in the backup memory device, in order to resume normal operation. However, disposing two non-volatile memory devices on each main board not only occupies more valuable space on the main board, but also incurs additional cost.

Another conventional solution is to switch the IOM originally operating in the passive mode to operate in the active mode in order to urgently resume normal operation of the system, and then manually repair the system by replacing an associated main board with a new main board, or replacing the defective firmware code with a new firmware code (e.g., by burning a functional firmware code into the non-volatile memory device). However, this solution would require much human labor and time, thereby increasing the overall operation and maintenance cost. In addition, the new main board or the new firmware code does not in fact provide one hundred percent guarantee of normal operation of the system.

SUMMARY

Therefore, an object of the disclosure is to provide a storage apparatus and a control system for the storage apparatus that can alleviate at least one of the drawbacks of the prior art. In particular, the storage apparatus with the control system thus provided is capable of automatic recovery and self-repair by utilizing a backup mechanism.

According to an aspect of the disclosure, a control system for a storage apparatus that includes a power unit, a fan unit and a storage unit including at least one hard disk drive (HDD) includes two main boards, two input/output modules (IOMs) and two non-volatile memory (NVM) devices. The two IOMs are respectively installed on the main boards and are electrically connected to each other. Each of the IOMs is electrically connected to the power unit, the fan unit and the storage unit in order to monitor and manage the power unit, the fan unit and the storage unit. The IOMs are adapted to operate in an active mode and a passive mode, respectively. The two NVM devices are respectively installed on the main boards and are electrically connected to the IOMs, respectively. Each of the NVM devices stores a firmware code. Each of the IOMs is configured to perform an initialization procedure to read the firmware code stored in one of the NVM devices that is electrically connected to the IOM, in order to execute a firmware corresponding to the firmware code and to enter one of the active mode and the passive mode in which the IOM is adapted to operate. The IOMs are configured such that when one IOM of the IOMs that is operating in the passive mode detects abnormal operation of the other IOM of the IOMs that is operating in the active mode, the one IOM enters the active mode, triggers the other IOM to enter a recovery mode, and sends, to the other IOM, the firmware code stored in one of the NVM devices that is electrically connected to the one IOM, in order for the other IOM to store the firmware code in the other of the NVM devices that is electrically connected to the other IOM so as to replace the firmware code that is originally stored in the other of the NVM devices.

According to an aspect of the disclosure, a storage apparatus includes the control system, and further includes a fan unit for dissipating heat inside the storage apparatus, a storage unit for storing data, and a power unit that is electrically connected to the fan unit, the storage unit and the control system for providing electrical power thereto. The storage unit includes at least one hard disk drive (HDD).

BRIEF DESCRIPTION OF THE DRAWINGS

Other features and advantages of the disclosure will become apparent in the following detailed description of the embodiment (s) with reference to the accompanying drawing, of which:

FIG. 1 is a block diagram that exemplarily illustrates a storage apparatus according to an embodiment of the disclosure.

DETAILED DESCRIPTION

FIG. 1 exemplarily illustrates a storage apparatus according to an embodiment of the disclosure. The storage apparatus includes a backplane 6, a power unit 7, a fan unit 8, a storage unit 9 and a control system 1. The control system 1 is electrically connected to the backplane 6, the power unit 7, the fan unit 8 and the storage unit 9. According to some embodiments of the disclosure, the control system 1 may be directly connected to the backplane 6 via, for example, at least one cable, a connector (e.g., an edge connector) or a printed circuit board (e.g., a bridge board). Further, each of the power unit 7, the fan unit 8 and the storage unit 9 may be directly connected to the control system 1 via, for example, a cable, a connector (e.g., an edge connector) or a printed circuit board (e.g., a bridge board), or indirectly connected to the control system 1 by means of the backplane 6.

According to some embodiments of the disclosure, the storage apparatus may be, but not limited to, JBOD (Just a Bunch of Disks). The fan unit 8 is disposed for dissipating heat inside the storage apparatus, and may be implemented by, but not limited to, plural fans. The storage unit 9 is disposed for storing data, and may be implemented by, but not limited to, at least one hard disk drive (HDD) or at least one solid state disk (SSD). The power unit 7 is disposed to provide sufficient electrical power for operating the storage apparatus. Specifically, the power unit 7 is electrically connected to the fan unit 8, the storage unit 9 and the control system 1 for providing electrical power thereto. The power unit 7 may be, but not limited to, a power supply.

The control system includes two main boards that include a first main board 21 and a second main board 22, two non-volatile memory (NVM) devices that include a first NVM device 31 and a second NVM device 32, and two input/output modules (IOMs) that include a first IOM 41 and a second IOM 42. The first and second main boards 21, 22 are coupled to the backplane 6.

The first and second NVM devices 31, 32 are respectively installed on the first and second main boards 21, 22, and are electrically connected to the first and second IOMs 41, 42, respectively. The first and second NVM devices 31, 32 each store a firmware code. According to some embodiments of the disclosure, the first and second NVM devices 31, 32 may each be a read-only memory (ROM) or a flash memory, but are not limited thereto.

Each of the first and second IOMs 41, 42 may be an integrated circuit (IC) chip. The first and second IOMs 41, 42 are respectively installed on the first and second main boards 21, 22, and are electrically connected to each other. Each of the first and second IOMs 41, 42 is electrically connected to the power unit 7, the fan unit 8 and the storage unit 9 (which may be at least one HDD), in order to monitor and manage the power unit 7, the fan unit 8 and the storage unit 9. For example, the first and second IOMs 41, 42 may monitor and manage a status of the power unit 7 that is related to electric power supplied by the power unit 7, a rotation speed of the fan unit 8 including multiple fans, an environmental temperature to be regulated by the fan unit 8, and an operation status of each HDD of the storage unit 9.

The control system 1 further includes a first bus 411, a second bus 412 and a third bus 413 that interconnects the first and second IOMs 41, 42 via the backplane 6, in order to communicate signals between the first and second IOMs 41, 42. Physical routes of the first, second and third buses 411, 412, 413 are not shown in FIG. 1 for the sake of brevity. In an embodiment, the first, second and third buses 411, 412, 413 are disposed on the backplane 6, and are electrically coupled to each of the first IOM 41 and the second IOM 42 through electrical connection of the backplane 6 with the first and second IOMs 41, 42, but the disclosure is not limited thereto.

Each of the first and second IOMs 41, 42 is configured to perform an initialization procedure after the control system 1 is powered up (or rebooted), in order to read the firmware code stored in the NVM device that is electrically connected to the IOM (that is, the first IOM 41 is to read the firmware code stored in the first NVM device 31, and the second IOM 42 is to read the firmware code stored in the second NVM device 32) so as to execute a firmware corresponding to the firmware code. By executing the firmware, one of the first and second IOMs 41, 42 enters an active mode, and the other one enters a passive mode. Both of the first and second IOMs 41, 42 are to monitor the power unit 7, the fan unit 8 and the storage unit 9, and to record information obtained by the monitoring process. However, only the IOM operating in the active mode can manage (or control) the power unit 7, the fan unit 8 and the storage unit 9 based on the information recorded by the IOM.

According to some embodiments of the disclosure, selection of which one of the first and second IOMs 41, 42 is to enter the active mode or the passive mode may be predetermined. However, in some other embodiments, selection of which one of the first and second IOMs 41, 42 is to enter the active mode or the passive mode may be determined otherwise. For example, selection of which one of the first and second IOMs 41, 42 is to enter the active mode or passive mode may be dynamically determined based on earlier completion of the initialization procedure. Techniques for determining the earlier completion are known in the art, which may be based on a ready signal sent by the first and second IOMs 41, 42 completing the initialization procedure. For example, in a case where each of the first and second IOMs 41, 42 would transmit the ready signal to the other IOM when completing the initialization procedure, for each of the first and second IOMs 41, 42, the IOM enters the active mode if no ready signal from the other IOM is received before the IOM completes the initialization procedure, and enters the passive mode when otherwise.

According to some embodiments, determination of which one of the first and second IOMs 41, 42 is to enter the active mode or the passive mode is indicated by a pre-designed identification code, wherein the identification code may be recorded by the main board on which the IOM is installed, and/or by the backplane 6. According to some embodiments, recordation of the identification code may be implemented by a set of pull-up/pull-down resistors on the main board and/or the backplane 6. In a case where the set of pull-up/pull-down resistors is on the backplane 6, the main board may access the identification code through a set of pins of a connector that is connected to the backplane 6. The following description are given in an exemplary context where the first IOM 41 is determined and is adapted to operate in the active mode, and the second IOM 42 is determined and is adapted to operate in the passive mode.

Each of the first and second IOMs 41, 42 is configured to continuously or periodically send a health signal to the other IOM among the first and second IOMs 41, 42 through the first bus 411, and to detect abnormal operation of the other IOM based on the health signal received from the other IOM. Specifically, for each IOM among the first and second IOMs 41, 42, the IOM is configured such that when the IOM is operating normally, the health signal (also referred to as "normal health signal" hereinafter) sent by the IOM has a varying logical value that alternately changes between logical zero and logical one, and that when the IOM is operating abnormally, the health signal sent by the IOM has a constant logical value (i.e., logical zero or logical one). That is, during the period when the IOM is operating normally, the health signal sent by the IOM would have a waveform of a pulse wave; during the period when the IOM is operating abnormally, the health signal sent by the IOM would have the waveform of a flat direct current (DC) or zero volts. According to some embodiments, the health signal may be a heartbeat signal of the IOM, or another signal that is generated based on the heartbeat signal and condition of external communications of the IOM. Therefore, each of the first and second IOMs 41, 42 may detect abnormal operation of the other IOM by monitoring the health signal received from the other IOM.

According to an embodiment of the disclosure, the first bus 411 used for transmitting the health signals may be formed by at least one connecting wire between two general-purpose input/output (GPIO) pins of the first IOM 41 and two GPIO pins of the second IOM 42. According to another embodiment of the disclosure, the first bus 411 may be an inter-integrated circuit (IC) bus formed between the first IOM 41 and the second IOM 42.

In some embodiments of the disclosure, the first IOM 41 and the second IOM 42 include a first register 51 and a second register 52, respectively, wherein each of the first and second registers 51, 52 stores a value that is controlled based on the health signal received by the corresponding IOM. Specifically, the first IOM 41 is configured to, only when the first IOM 41 is operating normally, periodically request the second IOM 42 to change the value stored in the second register 52 by sending the health signal that has a varying logical value to the second IOM 42. Similarly, the second IOM 42 is configured to, only when the second IOM 42 is operating normally, periodically request the first IOM 41 to change the value stored in the first register 51 by sending the health signal that has a varying logical value to the first IOM 41. The first IOM 41 would not be able to send the normal health signal (i.e., having a waveform of a pulse wave) to request changing the value stored in the second register 52 when the first IOM 41 is operating abnormally, and the second IOM 42 cannot change the value stored in the first register 51 when the second IOM 42 is operating abnormally. In these embodiments, the first IOM 41 may detect abnormal operation of the second IOM 42 by monitoring the value stored in the first register 51, and the second IOM 42 may detect abnormal operation of the first IOM 41 by monitoring the value stored in the second register 52. For example, in an embodiment, for each IOM among the first and second IOMs 41, 42, the value stored in a respective one of the first and second registers 51, 52 (referred to as "the corresponding register") is periodically switched between two values when the IOM receives the health signal that has a varying logical value (i.e., has the waveform of a pulse wave), and the IOM periodically reads the value stored in the corresponding register. In this embodiment, each time the IOM reads the value of the corresponding register, the IOM compares the value thus read with the value that is most recently read from the corresponding register, in order to determine whether the value of the corresponding register of the IOM has been recently changed by the other IOM. When it is determined that the value has not been changed, abnormal operation of the other IOM is detected.

The first and second IOMs 41, 42 are configured such that when the second IOM 42 that is operating in the passive mode detects abnormal operation of the first IOM 41 that is operating in the active mode, the second IOM 42 enters the active mode to timely substitute for the first IOM 41 so as to manage the power unit 7, the fan unit 8 and the storage unit 9 based on the information recorded by the second IOM 42, in order to maintain normal operation of the storage apparatus. Further, the second IOM 42 that has detected the abnormal operation of the first IOM 41 triggers the first IOM 41 to enter a recovery mode by using a recovery signal that is transmitted by the second IOM 42 to the first IOM 41 through the second bus 412. In an embodiment of the disclosure, the second IOM 42 is configured to trigger the first IOM 41 to enter the recovery mode by means of the recovery signal. Specifically, in this embodiment, the second IOM 42 is configured to continuously or periodically transmit the recovery signal to the first IOM 41, wherein the recovery signal sent by the second IOM 42 has a first value when normal operation of the first IOM 41 is detected by the second IOM 42, and has a second value which is different from the first logical value when abnormal operation of the first IOM 41 is detected. The first IOM 41 is configured to determine whether to enter the recovery mode based on the value of the recovery signal received from the second IOM 42. That is, the first IOM 41 is to enter the recovery mode in response to receiving the recovery signal that has the second logical value.

According to some embodiments of the disclosure, the second bus 412 used for transmitting the recovery signal may be formed by at least one connecting wire between two GPIO pins of the first IOM 41 and two GPIO pins of the second IOM 42, or may be another IC bus formed between the first IOM 41 and the second IOM 42, but is not limited thereto.

After the first IOM 41 enters the recovery mode, the second IOM 42 sends, to the first IOM 41 and through the third bus 413, the firmware code stored in the second NVM device 32 that is electrically connected to the second IOM 42, in order for the first IOM 41 (which is operating in the recovery mode) to store the firmware code in the first NVM device 31 that is electrically connected to the first IOM 41, so as to replace the firmware code that is originally stored in the first NVM device 31. After the first NVM device 31 stores the firmware code received from the second NVM device 32, the first IOM 41 operating in the recovery mode reads the firmware code from the first NVM device 31 to execute the firmware corresponding to the firmware code. It should be noted that because the second IOM 42 that is executing the firmware corresponding to the firmware code stored in the second NVM device 32 is operating normally, the firmware code stored in the second NVM device 32 is confirmed to be functional. Therefore, the control system 1 can be successfully self-repaired by updating the firmware code stored in the first NVM device 31 to the functional firmware code from the second NVM device 32, and the first IOM 41 may successfully resume normal operation by executing the firmware corresponding to the functional firmware code.

In an embodiment of the disclosure, the first IOM 41 operating in the recovery mode enters the passive mode after successfully executing the firmware so as to resume its normal operation. However, in another embodiment of the disclosure where the first IOM 41 is privileged to or predetermined to operate in the active mode, the first IOM 41, after successfully executing the firmware, enters the active mode based on, for example, the identification code recorded by the first main board 21, and triggers the second IOM 42 to switch from the active mode to the passive mode.

According to some embodiments of the disclosure, the third bus 412 used for transmitting the firmware code may be an $I^2C$ bus that is formed between the first IOM 41 and the second IOM 42 and that is different from the first and second buses 411, 412, or an Intelligent Platform Management Interface (IPMI) bus, but is not limited thereto.

It should be noted that for each IOM among the first and second IOMs 41, 42, the IOM continuously or periodically monitors operation status of the other IOM by monitoring the health signal received from the other IOM. That is, the first IOM 41 operating in the active mode may also detect abnormal operation of the second IOM 42 operating in the passive mode. Likewise, when detecting abnormal operation of the second IOM 42 operating in the passive mode, the first IOM 41 operating in the active mode may trigger the second IOM 42 to enter the recovery mode by using a recovery signal that is transmitted from the first IOM 41 to the second IOM 42 through the second bus 412, and then send the firmware code that is stored in the first NVM device 31 and that is currently being executed by the IOM 41 to the second IOM 42 so as to replace/update the firmware code in the second NVM device 32. After the second IOM 42 operating in the recovery mode receives the firmware code from the first NVM device 31 and stores the firmware code in the second NVM device 32, the second IOM 42 reads the firmware code to execute the firmware corresponding to the firmware code, and returns to the passive mode based on, for example, the identification code recorded by the second main board 22.

In summary, when one of the first and second IOMs 41, 42 is operating abnormally, the other one of the first and second IOMs 41, 42 that is operating normally takes the responsibility of being in the active mode to maintain normal operation of the storage apparatus, and triggers the abnormally-operating IOM to enter the recovery mode in order to replace/update the firmware code that is associated with the abnormally-operating IOM (i.e., stored in the NVM device associated with the abnormally-operating IOM) with the functional firmware code that is stored in the NVM device associated with the normally-operating IOM. After the firmware code associated with the abnormally-operating IOM is updated, the abnormally-operating IOM executes the updated firmware code to resume normal operation, and exits the recovery mode to enter the passive mode or the active mode. In such a way, the control system 1 may rapidly recover from problems related to abnormal IOM operation, and still has two IOMs that are operating normally following the recovery.

It can be appreciated that the abovementioned storage apparatus and the control system 1 have an advantageous characteristic in that each of the first and second main boards 21, 22 only needs one NVM device for storing only one copy of the firmware code corresponding to the firmware executed by the IOM of the main board. It is noted that the execution of firmware by the IOM of the main board is performed by reading the firmware code stored in the NVM device that is installed on the same main board. The memory capacity of the NVM device may be very small, as long as it is sufficient for storing the only one copy of the firmware code. In another case where the memory capacity of the NVM device is larger than that used for storing the only one copy of the firmware code, the additional memory space of the NVM device may be saved for other purposes.

Another advantageous characteristic of the storage apparatus and the control system 1 is that each of the first and second IOMs 41, 42 not only can read the firmware code from the corresponding one of the first and second NVM devices 31, 32 to execute the firmware, but also can acquire, when an error occurs in the firmware that the IOM is executing, the firmware code stored in the other NVM device that does not correspond to the IOM so as to execute the functional firmware which corresponds to the firmware code and which is being normally executed by the other IOM, and to store the firmware code in the NVM device corresponding to the IOM to replace the defective firmware code originally stored therein, thereby automatically and rapidly resuming normal operation. It can be further appreciated that, in comparison with conventional technique that replaces/updates a defective firmware code with a new firmware code that is obtained externally, said storage apparatus and said control system 1 that replace/update the defective firmware code with the firmware code which is being normally executed by an internal IOM and functionality of which is therefore guaranteed can save time for examining or testing whether the new firmware code is functional, and avoid a situation where the updated firmware code is found non-functional for the IOM and additional time is required to search for a functional firmware code.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control system for a storage apparatus that includes a power unit, a fan unit and a storage unit including at least one hard disk drive (HDD), the control system comprising:
   two main boards;
   two input/output modules (IOMs) that are respectively installed on said main boards and are electrically connected to each other, each of said IOMs being electrically connected to the power unit, the fan unit and the storage unit in order to monitor and manage the power unit, the fan unit and the storage unit, said IOMs being adapted to operate in an active mode and a passive mode, respectively; and
   two non-volatile memory (NVM) devices that are respectively installed on said main boards and are electrically connected to said IOMs, respectively, each of said NVM devices storing a firmware code;
   wherein each of said IOMs is configured to perform an initialization procedure to read the firmware code stored in one of said NVM devices that is electrically connected to said IOM, in order to execute a firmware corresponding to the firmware code and to enter one of the active mode and the passive mode in which said IOM is adapted to operate;
   wherein said IOMs are configured such that when one IOM of said IOMs that is operating in the passive mode detects abnormal operation of the other IOM of said IOMs that is operating in the active mode, the one IOM enters the active mode, triggers the other IOM to enter a recovery mode, and sends, to the other IOM, the firmware code stored in one of said NVM devices that is electrically connected to the one IOM, in order for the other IOM to store the firmware code in the other of said NVM devices that is electrically connected to the other IOM so as to replace the firmware code that is originally stored in the other of said NVM devices.

2. The control system of claim 1, wherein each of said IOMs is configured to send a health signal to the other of said IOMs, and to detect abnormal operation of the other of said IOMs based on the health signal received from the other of said IOMs.

3. The control system of claim 2, further comprising:
a bus that interconnects said IOMs for transmitting the health signals;
wherein each of said IOMs is configured to send, to the other of said IOMs, the health signal that has a varying logical value that alternately changes between logical zero and logical one when said IOM is operating normally, and to send the health signal that has a constant logical value of logical zero or logical one when said IOM is operating abnormally.

4. The control system of claim 2, further comprising:
a bus that interconnects said IOMs for transmitting the health signals;
wherein each of said two IOMs includes a register that stores a value;
wherein each of said two IOMs is configured to, only when said IOM is operating normally, continuously change the value stored in said register of the other IOM by sending the health signal.

5. The control system of claim 1, further comprising:
a bus that interconnects said IOMs for transmitting a recovery signal;
wherein said IOMs are configured such that when the one IOM that is operating in the passive mode detects abnormal operation of the other IOM that is operating in the active mode, the one IOM triggers the other IOM to enter the recovery mode by modifying the recovery signal sent through said bus to the other IOM.

6. The control system of claim 5, wherein:
said IOMs are configured such that the one IOM that is operating in the passive mode sends the recovery signal that has a first value through said bus to the other IOM that is operating in the active mode when normal operation of the other IOM is detected, and sends the recovery signal that has a second value through said bus to the other IOM when abnormal operation of the other IOM is detected, the second value being different from the first value; and
said IOMs are configured such that the other IOM determines whether to enter the recovery mode based on the recovery signal received from the one IOM.

7. The control system of claim 1, further comprising a bus that interconnects said IOMs for transmitting the firmware code.

8. The control system of claim 1, wherein said IOMs are configured such that after the one IOM enters the active mode from the passive mode and sends the firmware code to the other IOM, the other IOM stores the firmware code in one of said NVM devices that is electrically connected to the other IOM, executes the firmware corresponding to the firmware code, enters the active mode after successfully executing the firmware, and triggers the one IOM to enter the passive mode.

9. The control system of claim 1, wherein said IOMs are configured such that after the one IOM enters the active mode from the passive mode and sends the firmware code to the other IOM, the other IOM stores the firmware code in one of said NVM devices that is electrically connected to the other IOM, executes the firmware corresponding to the firmware code, and enters the passive mode after successfully executing the firmware.

10. The control system of claim 1, wherein one of said IOMs is adapted to operate in the active mode to monitor and manage the power unit, the fan unit and the storage unit of the storage apparatus, and the other of said IOMs is adapted to operate in the passive mode to monitor but not to manage the power unit, the fan unit and the storage unit of the storage apparatus.

11. A storage apparatus, comprising:
a fan unit for dissipating heat inside said storage apparatus;
a storage unit for storing data, said storage unit including at least one hard disk drive (HDD);
a control system of claim 1; and
a power unit that is electrically connected to said fan unit, said storage unit and said control system for providing electrical power thereto.

12. The storage apparatus of claim 11, wherein each of said IOMs is configured to send a health signal to the other of said IOMs, and to detect abnormal operation of the other of said IOMs based on the health signal received from the other of said IOMs.

13. The storage apparatus of claim 12, further comprising:
a bus that interconnects said IOMs for transmitting the health signals;
wherein each of said IOMs is configured to send, to the other of said IOMs, the health signal that has a varying logical value that alternately changes between logical zero and logical one when said IOM is operating normally, and to send the health signal that has a constant logical value of logical zero or logical one when said IOM is operating abnormally.

14. The storage apparatus of claim 12, further comprising:
a bus that interconnects said IOMs for transmitting the health signals;
wherein each of said two IOMs includes a register that stores a value;
wherein each of said two IOMs is configured to, only when said IOM is operating normally, continuously change the value stored in said register of the other IOM by sending the health signal.

15. The storage apparatus of claim 11, further comprising:
a bus that interconnects said IOMs for transmitting a recovery signal;
wherein said IOMs are configured such that when the one IOM that is operating in the passive mode detects abnormal operation of the other IOM that is operating in the active mode, the one IOM triggers the other IOM to enter the recovery mode by modifying the recovery signal transmitted through said bus to the other IOM.

16. The storage apparatus of claim 15, wherein:
said IOMs are configured such that the one IOM that is operating in the passive mode sends the recovery signal that has a first value through said bus to the other IOM that is operating in the active mode when normal operation of the other IOM is detected, and sends the recovery signal that has a second value through said bus to the other IOM when abnormal operation of the other IOM is detected, the second value being different from the first value; and said IOMs are configured such that the other IOM determines whether to enter the recovery mode based on the recovery signal received from the one IOM.

17. The storage apparatus of claim 11, further comprising a bus that interconnects said IOMs for transmitting the firmware code.

18. The storage apparatus of claim 11, wherein said IOMs are configured such that after the one IOM enters the active mode from the passive mode and sends the firmware code to the other IOM, the other IOM stores the firmware code in one of said NVM devices that is electrically connected to the other IOM, executes the firmware corresponding to the firmware code, enters the active mode after successfully executing the firmware, and triggers the one IOM to enter the passive mode.

19. The storage apparatus of claim 11, wherein said IOMs are configured such that after the one IOM enters the active mode from the passive mode and sends the firmware code to the other IOM, the other IOM stores the firmware code in one of said NVM devices that is electrically connected to the other IOM, executes the firmware corresponding to the firmware code, and enters the passive mode after successfully executing the firmware.

20. The storage apparatus of claim 11, wherein one of said IOMs is adapted to operate in the active mode to monitor and manage the power unit, the fan unit and the storage unit of the storage apparatus, and the other of said IOMs is adapted to operate in the passive mode to monitor but not to manage the power unit, the fan unit and the storage unit of the storage apparatus.

* * * * *